Jan. 7, 1969   B. W. IRVINE, JR., ET AL   3,420,512
GRATE BAR FOR TRAVELING GRATE CONVEYOR
Filed June 14, 1967   Sheet 1 of 2

INVENTORS
BOYD W. IRVINE JR.
KENNETH R. JUDKINS
BY Merchant & Gould
ATTORNEYS

INVENTORS
BOYD W. IRVINE JR.
KENNETH R. JUDKINS
BY Merchant & Gould
ATTORNEYS

United States Patent Office 3,420,512
Patented Jan. 7, 1969

3,420,512
GRATE BAR FOR TRAVELING GRATE
CONVEYOR
Boyd W. Irvine, Jr., and Kenneth R. Judkins, Silver Bay,
Minn., assignors to Reserve Mining Company, Silver
Bay, Minn., a corporation of Minnesota
Filed June 14, 1967, Ser. No. 645,997
U.S. Cl. 266—21                      6 Claims
Int. Cl. F27b 21/02

ABSTRACT OF THE DISCLOSURE

A grate bar for use in a traveling grate conveyor wherein a succession of pallets are moved in end-to-end contact through an indurating furnace, each of the pallets being adapted to support a plurality of grate bars in a side-by-side relationship to provide a material conveying surface. The grate bars herein are provided with a rounded upper surface and with spacing lugs attached to a bottom portion of the bar, so that the symmetrical top portion of the bar will have less tendency to crack from thermal fatigue.

Background of the invention

*Field of the invention.*—This invention relates generally to the field of traveling grate conveyors for indurating furnaces, and more particularly relates to an improved grate bar construction.

*Description of the prior art.*—In recent years, processes and apparatus have been developed for beneficiating low grade ores, such as taconite, by crushing, grinding, and magnetic separation techniques until a finely divided concentrate having a high iron content is obtained. Since this finely divided product is unsuitable for treatment in blast furnaces or the like, it must first be formed into pellets of suitable size and strength. Typically, these pellets are formed by mixing the finely divided powder with a suitable binding material and then passing the mixture through a balling drum such as that shown in the Haley Patent 2,707,304 that issued May 3, 1955. Although the pellets discharged from the balling drum are of the proper size, they are obviously quite soft and moist and do not have sufficient strength to be handled. The soft pellets must therefore be treated to impart to them the necessary hardness, strength and resistance to fragmentation.

One method of pellet induration involves the use of a traveling grate conveyor that carries the pellets through a suitable furnace. Such apparatus is disclosed in the Linney Patent 3,288,449 that issued Nov. 29, 1966. In this type of apparatus, a gas permeable traveling grate, endless conveyor is provided to carry the moist pellets through the furnace. The conveyor comprises a succession of pallets that are connected in end-to-end contact. The pallets are provided with oppositely disposed pellet retaining walls for retention of the pellet bed during horizontal travel of the conveyor. The retaining walls of the pallets are connected by cross-ribs that are adapted to support on their upper surfaces a plurality of grate bars in a side-by-side relationship. The grate bars collectively provide the pellet conveying surface.

The moist green pellets are continuously deposited in a uniform layer onto the feed end of the traveling grate. In the specific apparatus shown in the Linney patent, the traveling grate carries the layer of pellets through updraft drying, downdraft drying, combustion heating, downdraft reaction, and updraft reaction and cooling zones. After passing through the zones, the indurated pellets are discharged from the delivery end of the traveling grate.

During their passage through these various zones, the layer of pellets and the grate bars carrying them are subjected to tremendous temperature differences. For example, the temperature to which the pellet bed is exposed can vary from ambient up to as high as 2400° F. In a continuously operated indurating apparatus, the pellets, and the grate bars on which they lie, can be exposed to this temperature variation several times per hour. Because of the environment in which grate bars are used, they are subject to thermal fatigue and warpage caused by the cyclic temperature conditions, as well as to rapid oxidation and wear. In order to achieve optimum performance and maximum grate bar life, the material from which a grate bar is constructed must be carefully selected, and the configuration of the grate bar must be adopted with equal care. Although various high alloys are available for meeting individual requirements, few alloys will meet all the requirements for successful grate bar performance without careful attention to details of design. Since certain alloys are prohibitive in cost, and since material selection and design optimization are so closely interrelated, optimum design will permit the use of lower cost alloys without substantially decreasing performance.

An optimum design, in addition to reducing problems of thermal fatigue and warpage, will reduce wear on the individual grate bar by reducing blinding of the conveyor surface. Each grate bar normally carries spacing lugs extending laterally therefrom and disposed to contact similar lugs on adjoining bars to provide air passages between the bars. If the adjoining surfaces of the grate bars are not properly designed, there will be a tendency for the pellets to lodge in these passages, thereby impeding the necessary flow of air between the bars. The blinding of the passages not only reduces the efficiency of the indurating process by reducing air flow, but also results in structural damage to the bars themselves. Therefore, it is imperative that any grate bar design be effective to reduce or eliminate blinding.

Attempts are constantly being made to increase the service life of the grate bars, since grate bar loss represents a very substantial cost item. Grate bars that warp are not usable, since they permit material to drop between the bars. Thermal fatigue results in cracking of the bars. Not only does cracking result in ultimate breakage, but oxidation and deterioration is facilitated by the increased influence of heat and moisture conditions on the cracked bars.

Previous attempts to improve grate bar service life by changes in design have been related to gradual blending of section changes and to the rounding of corners. These changes were made to reduce thermal fatigue cracking and the failure of grate bars under the cyclic temperature conditions imposed under pelletizing machine operation. Although these changes have resulted in some improvement, it has not been of the degree required to reduce grate cost to a minimum level. We have determined that the desired operational characteristics can be obtained only by instituting major revisions in the grate bar design.

Summary of the invention

We have achieved a major improvement in grate bar performance whereby the effects of thermal fatigue are reduced and blinding of the grate is practically eliminated. The upper material carrying portion of our improved grate bar has a generally hemispherical cross section along the entire length thereof. This uniformly rounded surface faces upwardly, and in conjunction with adjoining grate bars, carries the bed of pellets through the indurating furnace. The lower portion of the grate bar has a pair of oppositely facing side walls that converge downwardly from the upper portion and has a flat bottom support surface. A plurality of spacing lugs extend laterally from each of the side walls, and are disposed to contact similar lugs on adjoining grate bars to provide air passages between the bars.

In prior art grate bars, a major cause of thermal fatigue cracking has been the spacing lugs extending from the upper portion of the grate bar. Since the upper portion of the grate bar is exposed to the greatest temperature changes, it is also subject to the greatest amount of expansion and contraction resulting from these temperature changes. If a spacing lug is attached to the upper portion of the bar, it will change temperature at a rate different from the remainder of the bar because of its different mass. Thus, the interior temperature of the spacing lugs will lag behind the temperature of the remainder of the bar. These temperature differentials, which will exist any time the environmental temperature is changing rapidly, cause different areas of the upper portion of the grate bar to expand and contract at different rates. This differential expansion and contraction causes thermal fatigue and eventual cracking of the grate bar. To reduce this thermal fatigue, we have moved the spacing lugs from the upper portion of the bar to the lower portion of the bar. Since the temperature changes at the lower portion of the bar are not as radical, the problem of cracking due to thermal fatigue is greatly reduced.

Moving the spacing lugs to the lower portion of the grate bar also permits the upper portion of the bar to be constructed in the most effective configuration. Since the upper portion of the bar is now completely symmetrical throughout its entire length, the problems of differential expansion and contraction are practically eliminated. Less cracking and warpage occurs, and the rate of deterioration of the bar through oxidation is also reduced. Also, the self-cleaning properties of the bars are improved due to the double tapered section from top to bottom of the bars. The rounded upper portions provide self-cleaning action as the pellets are discharged from the pallets at the end of the machine. The tapered bottom area of the bar is self-cleaning when the bar is in the upright position.

*Description of the preferred embodiment*

Figure 1:
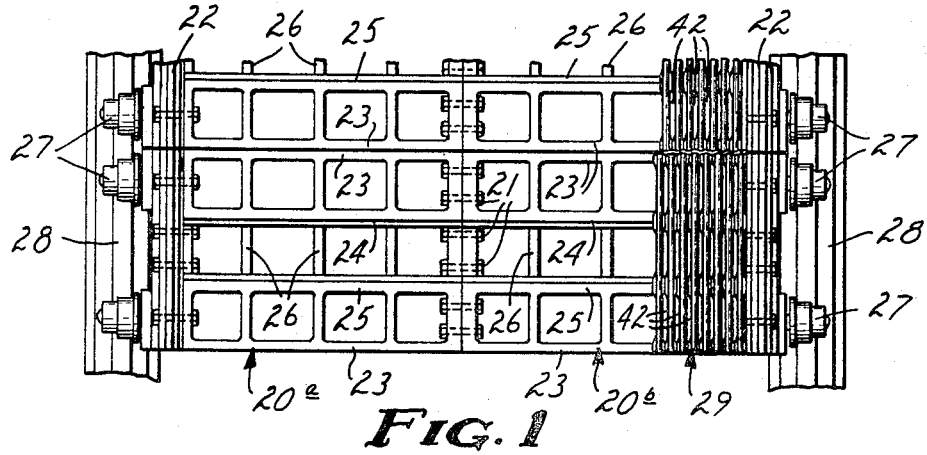
FIGURE 1 is a top plan view of a pallet frame mounted on a pair of tracks, the frame having thereon a number of grate bars, portions thereof being cut away.
Figure 2:
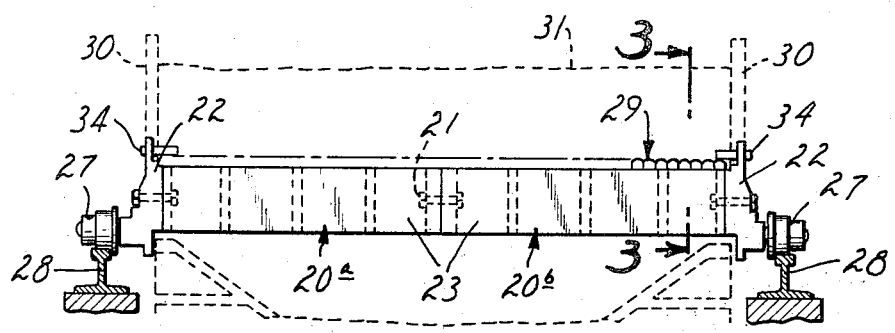
FIGURE 2 is an end view of the apparatus of FIGURE 1, portions thereof being shown in phantom and other portions thereof being shown in section.

Referring now to the drawings, wherein like numbers are used throughout the several views to identify the same elements of the disclosure, there is disclosed in FIGURES 1 and 2 a top frame comprising a left section 20a and a right section 20b united by bolts 21. Pallet sections 20a and 20b each include a wheel mounting casting 22, outer cross-ribs 23, inner cross-ribs 24 and 25, and bracing ribs 26. The pallet is supported on wheels 27 that run on rails or tracks 28. The cross-ribs 23, 24, and 25 carry a plurality of grate bars 29 that are assembled side-by-side and which have spacing means to leave openings for the passage of air or gas in either direction.

Detachable pallet retaining walls or plates 30 extend upwardly from the pallet wheel mounting casting 22 to retain the pallet load, the upper surface of which is represented by the dotted line 31 in FIGURE 2.

Since the traveling grate conveyor assembly must, in some arrangement of endless nature, return upside-down on a lower conveyor flight, the grate bars 29 have an interlock with inner cross-ribs 24 and 25. In the present case, each grate bar has a depending lug assembly 33 having oppositely projecting fingers 33a which extend beneath a corresponding pair of retaining flanges 24a and 25a of the inner cross-ribs 24 and 25. Assembly of the grate bar 29 in position is permitted by cutting away a sufficient amount of flanges 24a and 25a along the side of the pallet to permit dropping each grate bar to rest on the inner cross-ribs 24 and 25, and then sliding the grate bar toward the center. When the assembly is completed except for one outer bar at each end, a special end bar is used, or the ordinary end bar is retained by spaced pins 34 extending in from the wheel casting 22, or in some other suitable manner.

Figure 7:
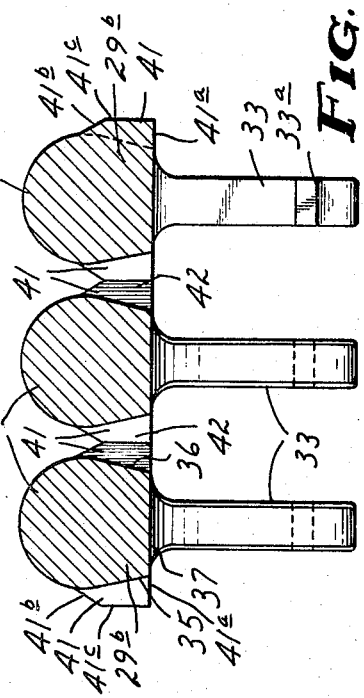
FIGURE 7 is a vertical sectional view of three adjoining grate bars, taken along line 7—7 of FIGURE 4.

Each grate bar 29 has an elongated body with a material carrying upper portion 29a and a cross-rib engaging lower portion 29b. Each upper portion 29a has a generally hemispherical cross section along the entire length thereof, as best shown in FIGURE 7, to provide a convex rounded surface facing upwardly to carry the pellets in conjunction with adjoining grate bars.

Each lower portion 29b has a pair of opposed side walls 35 and 36 converging downwardly from upper portion 29a and a flat bottom surface 37 adapted to engage cross-ribs 23, 24, and 25 for support thereby. Thus, the upper rounded surface of grate bar 29 blends smoothly into side walls 35 and 36 to form a smooth, continuous rounded outer surface of the grate bar body.

The elongated body of each grate bar includes a pair of oppositely disposed end faces 38 and 39. Each end face 38 and 39 is formed as a surface corresponding to a cylindrical section with the axis of curvature thereof lying in a vertical plane bisecting the grate bar along the longitudinal axis. These arcuate, convex end faces 38 and 39 tend to uniformly distribute the expansion-contraction stresses under cyclic temperature conditions to prevent cracking of the grate bar.

Each grate bar 29 is provided with a plurality of spacing lugs 41 that extend laterally from each of the side walls 35 and 36. Spacing lugs 41 are disposed to contact similar lugs on adjoining grate bars to provide air passages 42 between the bars. Each of the spacing lugs has a flat bottom surface 41 lying in the same plane as the flat bottom surface 37 of the grate bar body. Each of the lugs 41 also has a downwardly and outwardly sloping upper surface 41b that blends smoothly into the surface of upper portion 29a. Bottom surface 41a is connected to upper surface 41b by a vertical wall surface 41c. Vertical wall surfaces 41c of adjoining bars are designed to contact each other as shown in FIGURE 7 to space the grate bars. Wall surface 41c and upper surface 41b are connected to a side wall 35 or 36 by lug end faces 41d and 41e.

Figure 3:
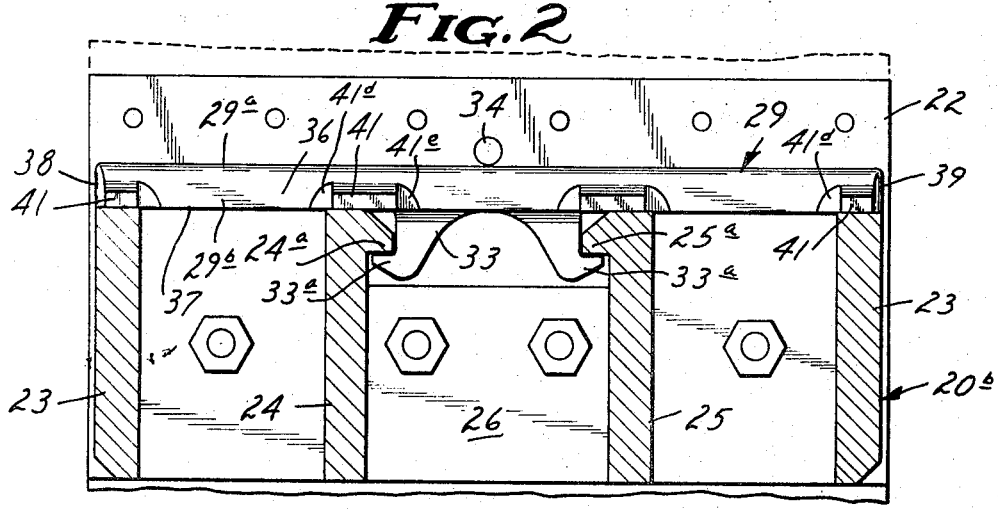
FIGURE 3 is an enlarged view taken along line 3—3 of FIGURE 2.
Figure 4:
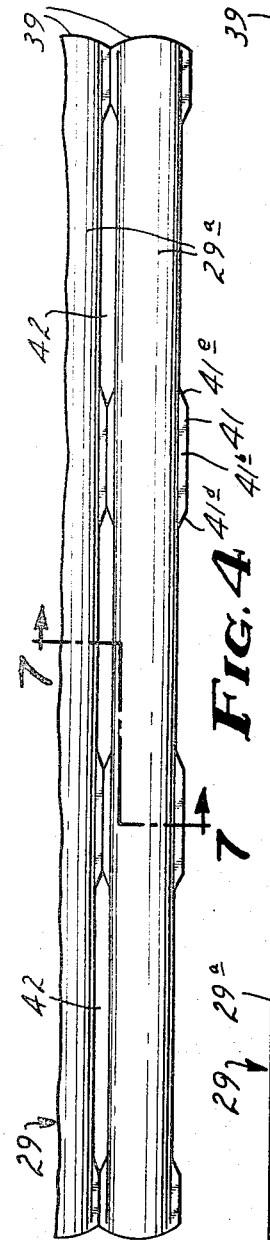
FIGURE 4 is a top plan view on an enlarged scale showing a complete grate bar constructed in accordance with the teachings of the present invention, and showing a fragmentary portion of an adjoining grate bar.
Figure 5:
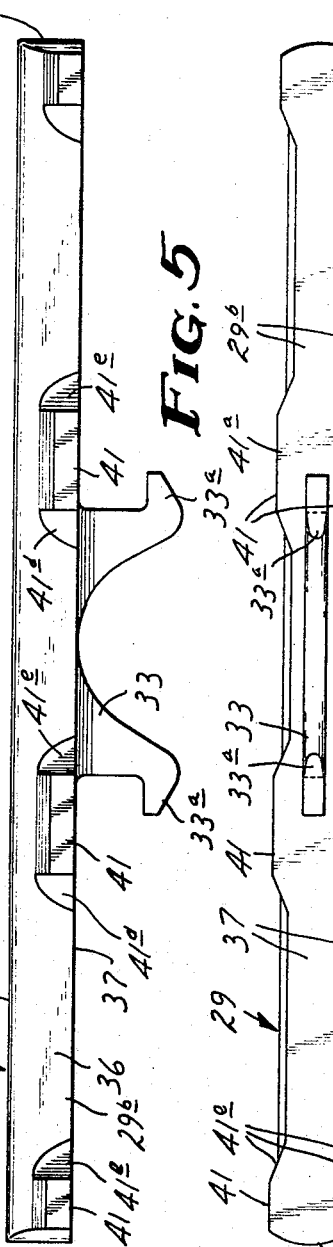
FIGURE 5 is a side view of the grate bar shown in FIGURE 4.
Figure 6:
FIGURE 6 is a bottom plan view of the grate bars shown in FIGURE 4.

As best shown in FIGURE 3, each spacing lug 41 is positioned on the grate bar to completely overlie a corresponding cross-ribs 23, 24, or 25 to thereby protect the complete upper surfaces of the cross-ribs. The upper surfaces of the cross-ribs are therefore substantially shielded from impact by or intimate contact with the hot gases which normally pass either downwardly or upwardly through the pellet bed and openings 42.

Our tests have indicated that the new configuration described herein has resulted in a major extension in grate bar life. Since the spacing lugs 41 have been moved to the lower portion 29b of the grate bar body, the upper portion 29a has a completely uniform cross-section throughout the entire length thereof. This rounded, symmetrical, upper portion 29a, which is exposed to the most radical changes in temperature, is now capable of withstanding these changes in temperature for a longer period of time without deteriorating from thermal fatigue Because of the uniform cross section of upper portion 29a, expansion and contraction caused by temperature changes occurs at the same rate throughout the entire length of the grate bar. Since expansion and contraction take place at a more uniform rate, stresses in the bar are reduced, thus reducing thermal fatigue and the resultant cracking of the bar.

The uniformly rounded upper surfaces of the adjoining grate bars also tends to decrease the trapping of pellets between adjoining bars. Since some relative movement between the bars does occur, there is always a tendency for individual pellets to fall into the passage 42 and become locked between the bars. The present grate bars, however, because of their uniformly rounded upper portions, tend to have a self-cleaning action that prevents blinding of the grate.

By reducing cracking, and by reducing blinding of the grate, the rate at which the bars deteriorate can be significantly reduced. A smooth grate bar and an open grate are much less susceptible to damage caused by oxidation and wear, than are a cracked grate bar and a blinded grate.

We have described herein a preferred embodiment of our invention. Since changes might be made in this preferred embodiment without departing from the spirit of our invention, we intend to be bound only by the scope of the appended claims.

We claim:
1. A grate bar for use in a material conveying grate wherein a succession of pallets are moved in end-to-end contact, wherein each pallet comprises a generally rectangular hollow frame having a pair of pellet retaining walls, and wherein cross-ribs connect said retaining walls, said cross-ribs being adapted to support on their upper surfaces a plurality of said grate bars in side-by-side relationship to collectively provide a material conveying surface, each of said grate bars having an improved construction whereby cracking and warping from thermal fatigue caused by differential expansion and contraction is reduced, and whereby blinding of said grate is reduced, comprising:
   (a) an elongated body having a material carrying upper portion and a cross-rib engaging lower portion, said upper portion having a generally hemispherical cross section along the entire length thereof to provide a convex rounded surface facing upwardly to carry said material in conjunction with adjoining grate bars, said lower portion having a pair of opposed side walls converging downwardly from said upper portion and a flat bottom surface adapted to engage said cross-ribs for support thereby, said upper rounded surface blending into said side walls to form a continuous outer surface of said body; and
   (b) said body having a plurality of spacing lugs extending laterally from each of said side walls and disposed to contact similar lugs on adjoining grate bars to provide air passages between said bars, said lugs each having a flat bottom surface lying in the same plane as said flat bottom surface of said body, and said lugs being spaced to overlie and protect the complete upper surfaces of said cross-ribs.

2. The apparatus of claim 1 wherein said elongated body includes a pair of oppositely disposed arcuate, convex end faces to uniformly distribute the expansion-contraction stresses under cyclic temperature conditions.

3. A grate bar for use in a traveling grate conveyor, said grate bar having an improved construction whereby cracking and warping from thermal fatigue caused by differential expansion and contraction is reduced, and whereby blinding of said grate is reduced, comprising:
   (a) an elongated body having a material carrying upper portion and a support engaging lower portion, said upper portion having a rounded upper surface to carry said material in conjunction with adjoining grate bars, said lower portion having a pair of opposed side walls converging downwardly from said upper portion, and a flat bottom support engaging surface; and
   (b) said body having a plurality of spacing lugs extending laterally from both of said side walls and disposed to contact similar lugs on adjoining grate bars to provide air passages between said bars.

4. The apparatus of claim 3 wherein said upper portion of said body has a generally hemispherical cross section along the entire length thereof, said upper portion thereby being adapted to gain or lose heat at a uniform rate under cyclic temperature conditions to reduce thermal fatigue cracking.

5. The apparatus of claim 3 wherein said spacing lugs each have a flat bottom surface lying in the same plane as said flat bottom surface of said body.

6. The apparatus of claim 3 wherein said body includes a pair of opposite end faces, each of said end faces being formed as a surface corresponding to a cylindrical section with the axis of curvature thereof lying in a vertical plane bisecting said grate bar along a longitudinal axis thereof, said rounded end faces being adapted to more uniformly distribute stresses under cyclic temperature conditions.

References Cited

UNITED STATES PATENTS 2,835,485  5/1958  Woody _____ 266—21
3,063,696  11/1962  Culling _____ 266—21

FREDERICK L. MATTESON, Jr., *Primary Examiner.*

R. A. DUA, *Assistant Examiner.*